United States Patent
Buccafusca (10) Patent No.: US 8,639,462 B2
(45) Date of Patent: Jan. 28, 2014

(54) METHOD AND SYSTEM FOR DETERMINING THE TIME-OF-FLIGHT OF A SIGNAL

(75) Inventor: Osvaldo Buccafusca, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 375 days.

(21) Appl. No.: 12/782,104

(22) Filed: May 18, 2010

(65) Prior Publication Data

US 2011/0288801 A1 Nov. 24, 2011

(51) Int. Cl.
*G01R 23/16* (2006.01)

(52) U.S. Cl.
USPC ............. 702/77; 702/72; 702/79; 702/176; 702/177; 455/42; 455/67.14; 455/67.16; 73/861.27; 73/861.28

(58) Field of Classification Search
USPC ............ 702/66, 7, 72, 77, 79, 125, 71, 177, 702/176; 455/42, 67.14, 67.16; 73/861.27, 73/861.28
See application file for complete search history.

(56) References Cited

U.S. PATENT DOCUMENTS

| | | | |
|---|---|---|---|
| 5,517,994 A * | 5/1996 | Burke et al. ............... 600/437 |
| 5,818,735 A | 10/1998 | Tigwell et al. | |
| 5,920,278 A * | 7/1999 | Tyler et al. ............... 342/33 |
| 5,983,730 A | 11/1999 | Freund et al. | |
| 6,131,076 A | 10/2000 | Stephan et al. | |
| 6,504,793 B2 | 1/2003 | Fuenfgeld | |
| 6,865,137 B2 | 3/2005 | Lyon et al. | |
| 7,010,973 B2 | 3/2006 | Bartoli et al. | |
| 7,010,974 B2 | 3/2006 | Spanke et al. | |
| 7,334,451 B1 | 2/2008 | Fauveau | |
| 2005/0172707 A1 | 8/2005 | Kanatani et al. | |
| 2006/0239121 A1 | 10/2006 | Kong et al. | |
| 2007/0051486 A1 | 3/2007 | Lizuka et al. | |
| 2008/0024145 A1 | 1/2008 | Schultheiss et al. | |
| 2008/0204223 A1 | 8/2008 | Chu et al. | |
| 2010/0005890 A1 | 1/2010 | Miyamoto | |
| 2012/0044786 A1 | 2/2012 | Booij et al. | |

OTHER PUBLICATIONS

J. Edwards, "Frequency Domain Theory and Applications", DSP Numerix, 2006, pp. 1-42.
V. Toronov et al., "Optimization of the Signal-to-Noise Ratio of Frequency-Domain Instrumentation for Near-Infrared Spectro-Imaging of the Human Brain", Optics Express, vol. 11, No. 21, Oct. 20, 2003, pp. 2717-2729.

* cited by examiner

*Primary Examiner* — Alexander H Taningco
*Assistant Examiner* — Paul D Lee (57) ABSTRACT

A method of estimating the time of flight of a burst signal includes: receiving the burst signal; determining the slope of the phase characteristic of the Fourier transform of the received burst signal; and estimating the time-of-flight of the burst signal from the slope of the phase characteristic of the Fourier transform of the received burst signal.

19 Claims, 7 Drawing Sheets

METHOD AND SYSTEM FOR DETERMINING THE TIME-OF-FLIGHT OF A SIGNAL

BACKGROUND

There are a number of various applications where determining the time-of-flight of a signal is required. These applications include laser range finders, ultrasonic level detectors, and ultrasonic flow meters.

Figure 1:
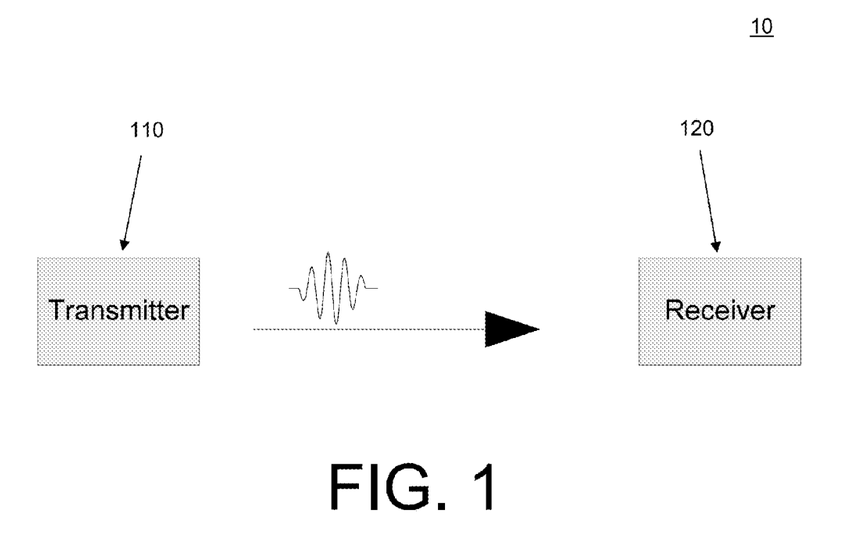
FIG. 1 illustrates an example of a time-of-flight (TOF) measurement system with a pitch-catch configuration.
Figure 2:
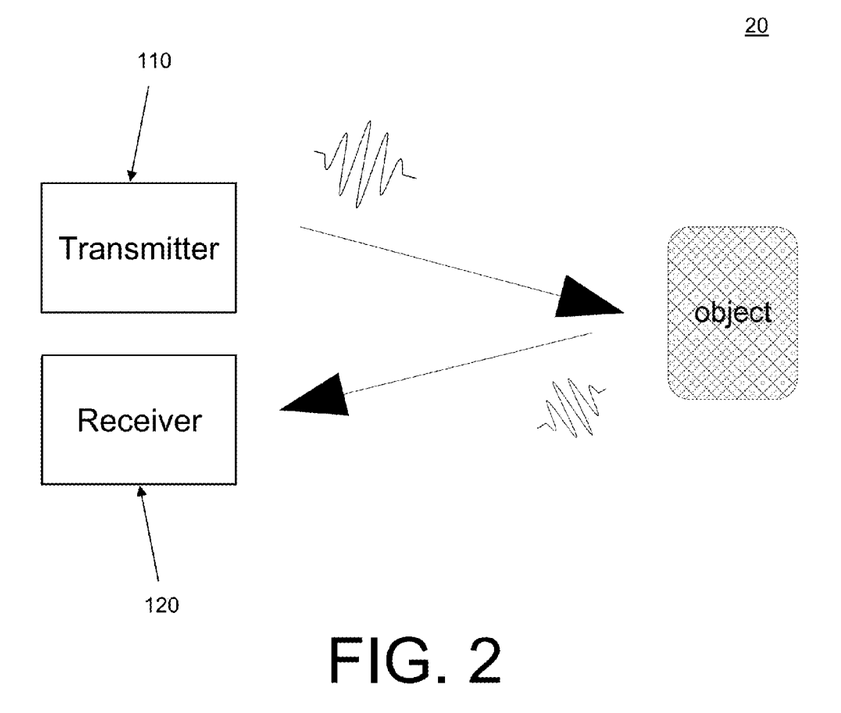
FIG. 2 illustrates an example of a TOF measurement system with a pulse-echo configuration.

In general, a system for determining the time-of-flight (TOF) a signal can take one of two forms: pitch-catch and pulse-echo. FIG. 1 illustrates an example of a pitch-catch TOF measurement system, and FIG. 2 shows an example of a pulse-echo TOF measurement system. In either configuration, a transmit (TX) device 110 transmits a signal at a predetermined time and the signal is then sensed some time later by a receive (RN) device 120. In the pitch-catch system shown in FIG. 1, the signal is transmitted directly from transmit (TX) device 110 to receive (RX) device 120, in the pulse-echo system shown in FIG. 2, the signal is bounced or reflected off an object as it travels its path from (TX) device 110 to receive (RX) device 120. In some embodiments of a pulse-echo system, the signal may be sensed with the same device that transmitted the signal i.e., the TX device and the RX device are the same. The time it takes the signal to travel from the TX device to the RX device is the time-of-flight of the signal. The signal may be an acoustic signal, such as an ultrasonic wave or signal, or an electromagnetic wave or signal, for example a microwave signal, a beam of visible or ultraviolet light, Achieving a required degree of accuracy in the time-of-flight measurement is both critical and difficult.

Most TOF measurement systems in applications such as radar, sonar or ultrasound rely on time domain data. These systems measure the time of reception of a signal versus a selected reference time.

A simple approach uses threshold levels. With a threshold measurement technique, the measurement system determines the times that the transmitted signal and the received signal each cross a threshold level, and estimates the time-of-flight of the signal as the difference between the times of these two threshold-crossings. However, in many systems this will provide a less than desirable resolution. For example, when a system employs ultrasonic transducers, these transducers are resonant devices with a limited bandwidth, and therefore the signal has an associated envelope with a rise and fall time. Any additive noise in the system could cause false readings by either accelerating or decelerating the time when the threshold crossing occurs. This is commonly referred to as cycle slip. In practice, fluctuations in amplitude due to absorption, noise, and temperature limit the accuracy of such a simple threshold approach to TOF measurement.

A number of techniques have been used to improve the resolution of the TOF measurement. One approach involves modulating the envelope of the transmit signal and demodulating it when received. However, this technique still relies heavily on the amplitude information in the signal, and so it still suffers from some degradation from fluctuations in amplitude due to absorption, noise, and temperature.

To increase accuracy, a "marker" may be embedded in the transmitted signal. This marker could be implemented with amplitude, frequency, or phase modulation of the transmitted signal. The receiver can then detect this feature with improved immunity to Boise and other factors which lead to timing uncertainties which degrade accuracy of the TOF measurement. However, this approach can add complexity and cost to the system.

An alternative approach performs a correlation of the received signal in the frequency domain. However, this approach requires two signals, such as two transmitted signals, or a transmitted signal and a reference signal (theoretical or experimental), and again can add complexity and cost.

What is needed, therefore, is an accurate method of measuring or estimating the time-of-flight of a signal. What is also needed is a system which can accurately measure or estimate the time-of-flight of a signal.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions shown in the drawings may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

As used herein, the term "burst signal" consists of a repetitive (sinusoidal, triangular, square, or any other shape) signal with a specific fundamental frequency (or period), modulated by a non-repetitive envelope (such as a Gaussian or rectangular pulse). In the case of acoustic (e.g., ultrasound) time-of-flight (TOF) measurement systems, the fundamental frequency is usually the resonance frequency of the transducers and the envelope is given by the response of the system. In the case of electromagnetic TOF measurement systems, the fundamental frequency is the carrier (which in optical systems is the light wavelength) and the envelope is the signal modulation.

Figure 3:
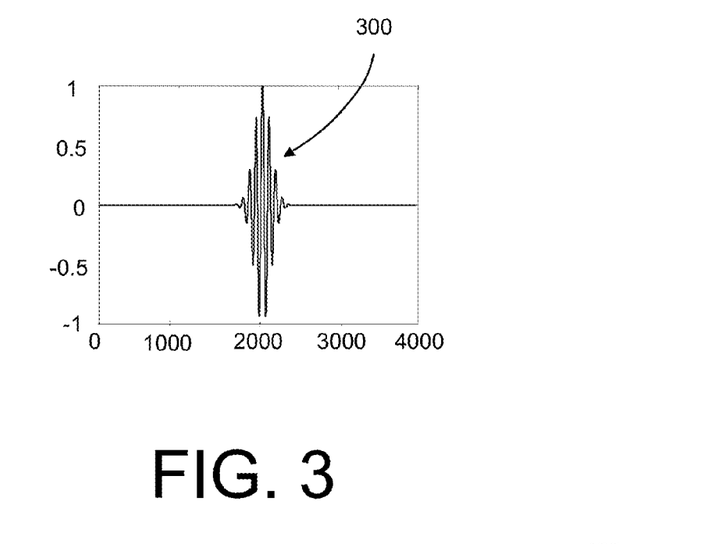
FIG. 3 shows a time domain plot of an example burst signal.

FIG. 3 shows a time domain plot y(t) of an example burst signal 300. In FIG. 3 burst signal 300 is a 10 MHz sinusoidal burst (i.e., the fundamental frequency is 10 MHz) centered in the middle of a time window that is sampled with 4000 digital sampling points. That is, burst signal 300 is centered on the $2000^{th}$ sampling point of the 4000 sampling-point window.

Figure 4:
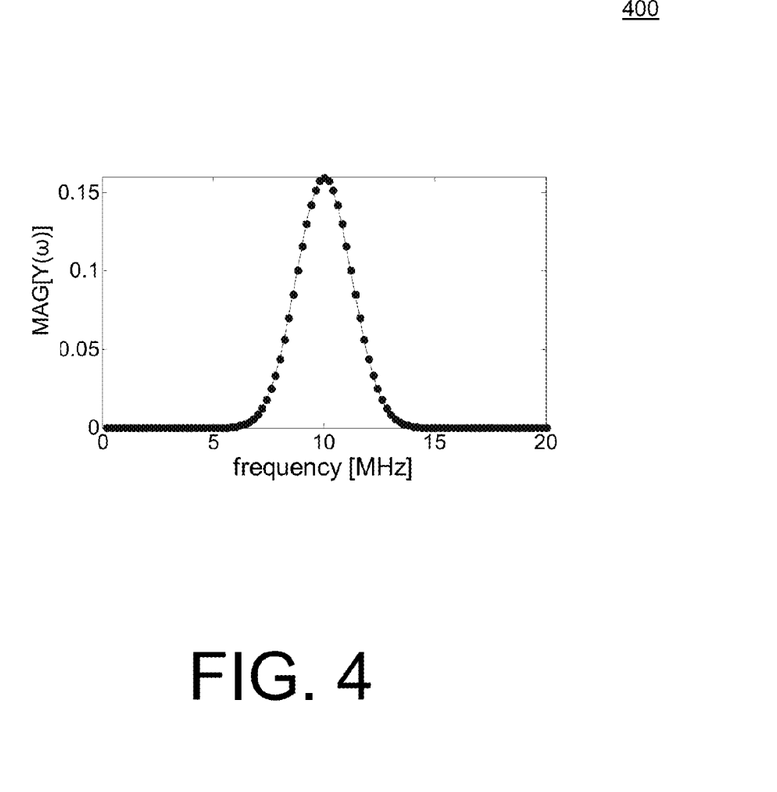
FIG. 4 shows a plot of the amplitude of the Fourier transform of the burst signal of FIG. 3.

FIG. 4 shows a plot of the amplitude of the Fourier transform, $F(y(t))=Y(\omega)$, of the burst signal 300 of FIG. 3. As would be expected, the amplitude of the Fourier transform $Y(\omega)$ of burst signal 300 has a peak at the fundamental frequency of 10 MHz.

Figure 5:
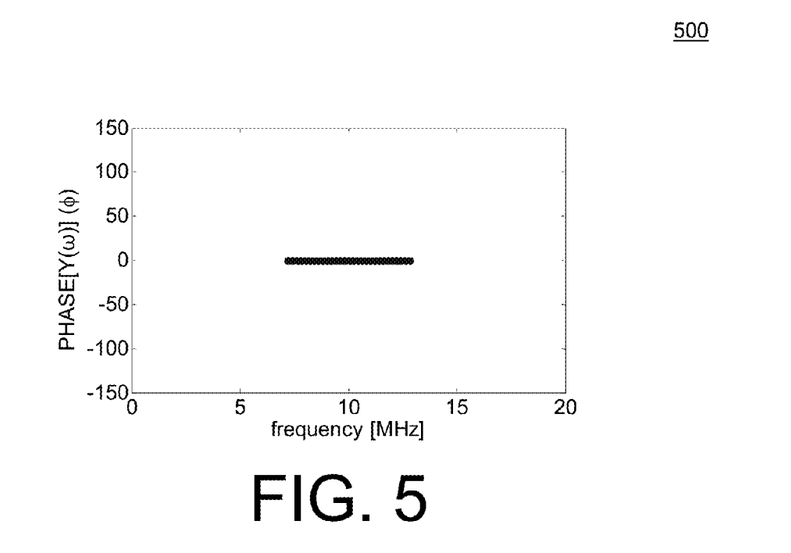
FIG. 5 shows a plot of the phase of the Fourier transform of the burst signal of FIG. 3.

FIG. 5 shows a plot of the phase of the Fourier transform $Y(\omega)$ of burst signal 300 in a frequency band about the fundamental frequency of 1.0 MHz (e.g., 10 MHz±3 MHz). As can be seen in FIG. 5, when burst signal 300 is centered at the middle of the time window as shown in FIG. 3, then the phase of the Fourier transform $Y(\omega)$ is constant within this frequency band centered at the fundamental frequency.

However, if a burst signal y(t) is shifted from the center of the time window by a number of samples N, then the Fourier transform of the burst signal has a linear phase component as given by:

$$F(y(t-to))=e^{-i\omega to}F(y(t))=e^{-\omega to}Y(\omega) \quad (1)$$

where to is the time equivalent of the shift from the center from the time window, i.e.:

$$to=\text{Sampling Rate}*N \quad (2)$$

It should be noted that these equations are valid even when N is not an integer.

Figure 6:
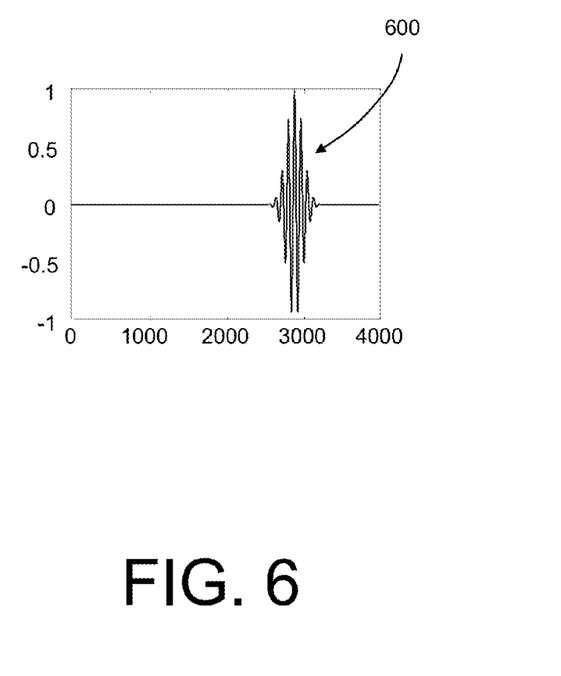
FIG. 6 shows a time domain plot of a time-delayed version of the burst signal of FIG. 3.

FIG. 6 shows a time domain plot of a burst signal 600 which is a time-delayed version, y(t−to), of the burst signal 300 of FIG. 3.

Figure 7:
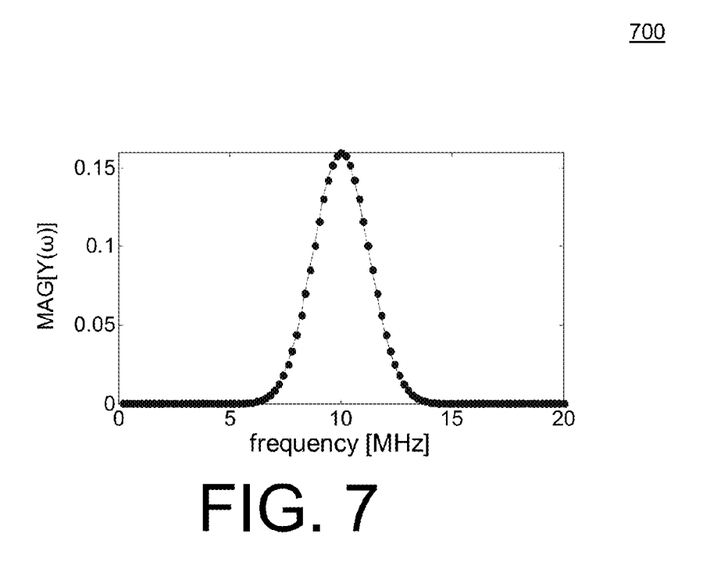
FIG. 7 shows a plot of the amplitude of the Fourier transform of the time-delayed burst signal of FIG. 6.

FIG. 7 shows a plot of the amplitude of the Fourier transform $Y(\omega)$ of the time-delayed burst signal 600 of FIG. 6. As would be expected, the amplitude of the Fourier transform is not changed by the delay of the burst signal, so long as the burst signal still occurs within the time window. So the amplitude plot on FIG. 7 matches the amplitude plot in FIG. 4.

Figure 8:
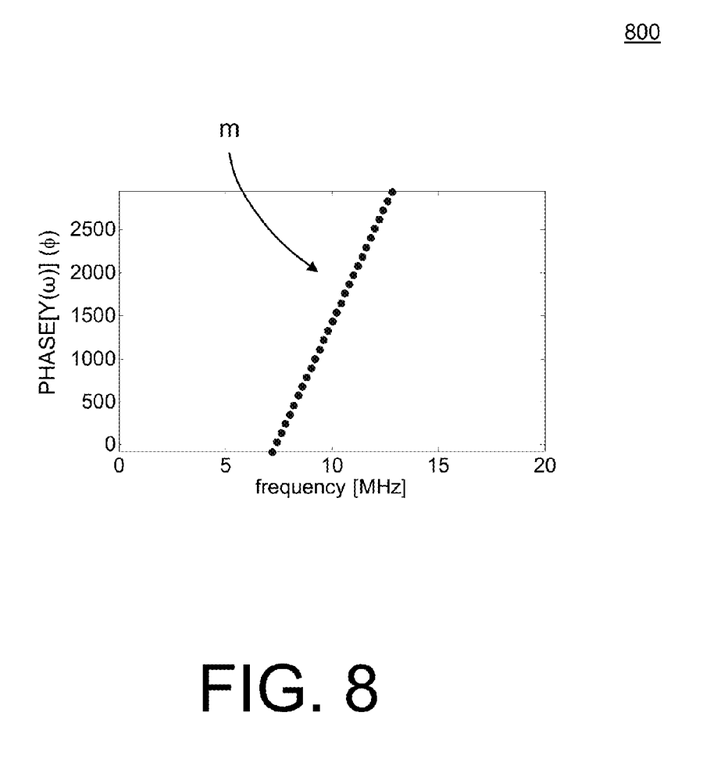
FIG. 8 shows a plot of the phase of the Fourier transform of the time-delayed burst signal of FIG. 6.

FIG. 8 shows a plot of the phase of the Fourier transform $Y(\omega)$ of the time-delayed burst signal 600 of FIG. 6 in a frequency band (e.g., ±3 MHz) about the fundamental frequency of 10 MHz. As provided by Equation (1) and shown in FIG. 8, the Phase=$\phi$ of the Fourier transform $Y(\omega)$ can be written as a linear function of the frequency:

$$\phi=mf+b \quad (3)$$

where m is the slope of the phase of the Fourier transform $Y(\omega)$ as a function of frequency.

Thus, from the slope m one can determine the time delay to of the burst signal with respect to the center of the time window as:

$$to = \frac{m}{2\pi} \quad (4)$$

Through equation (4) we can determine the delay of a burst signal with respect to the center of a time window by measuring, in a frequency band centered at the fundamental frequency, the slope of the phase response of the Fourier transform of the burst signal within the time window. In general, with knowledge of the length of the time window, by determining the delay of the burst signal with respect to the center of a time window, we can determine the delay with respect to any point in the time window (including for example the start of the time window).

This information can be used to estimate the time-of-flight (TOF) of the burst signal.

For example, in one embodiment, if some point in the time window e.g., the start or the center) is known to be synchronized with, or have a predetermined time offset from, the transmission time of the burst signal, then the TOF of the burst signal can be determined from the slope of phase of the Fourier transform of the received burst signal within the time window. The relationship between the transmission time of the burst signal and the start or center of the time window can be established a number of ways, including via calibration, or by a synchronization technique.

In another embodiment, the slope of the phase response of the Fourier transform of a transmit burst signal, and the slope of phase response of the Fourier transform of the received burst signal, are both measured within the same time window, and then the TOF of the burst signal can be determined from the difference between the two slopes.

Figure 9:
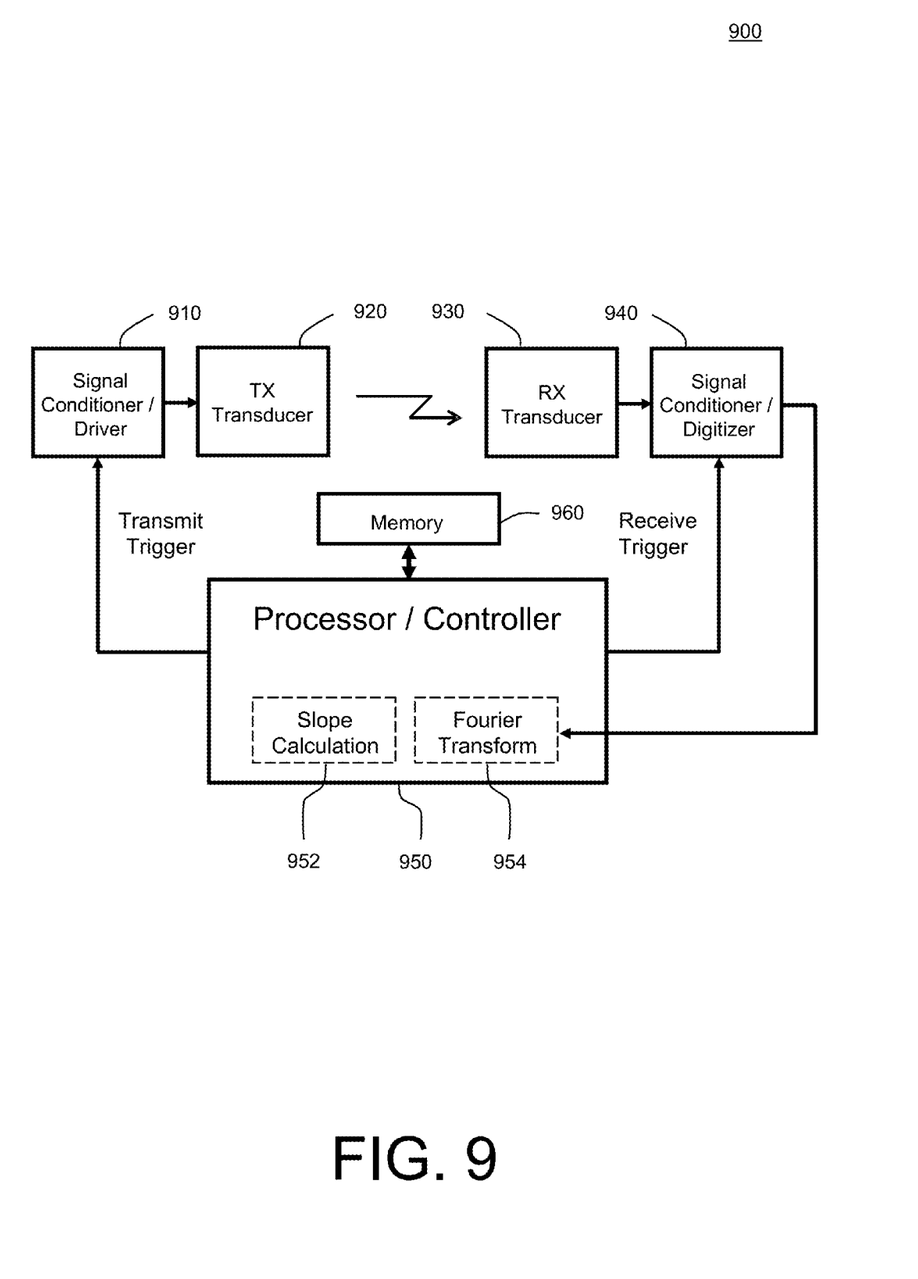
FIG. 9 illustrates one embodiment of a system for measuring the time-of-flight of a FIG. 10 illustrates another embodiment of a system for measuring the time-of-flight of a signal.

FIG. 9 illustrates one embodiment of a system 900 for measuring the time-of-flight of a signal. System 900 includes a transmit signal conditioner or processor and driver 910, a transmit transducer 920, a receive transducer 930, a receive signal conditioner or processor and digitizer 940, a processor or controller 950, and memory 960.

In various embodiments, transmit signal processor and driver 910 can include any convenient combination of analog and digital hardware and firmware, including application specific integrated circuits (ASICs), a field programmable gate array (FPGA), etc.

Depending on the type of signal to be transmitted and whose time-of-flight is to be determined (e.g., an acoustic wave or signal or an electromagnetic wave or signal), the transmit transducer 920 can be an acoustic (e.g., ultrasonic) transducer, a radio frequency or microwave antenna, a laser, a light emitting diode, etc. Similarly, receive transducer 930 can be an acoustic (e.g., ultrasonic) transducer, an or microwave antenna, a photodiode, etc.

In some embodiments, receive signal conditioner or processor and digitizer 940 may include one or more amplifiers, filters, and an analog-to-digital converter (ADC) as a digitizer.

Processor or controller 950 may comprise hardware, firmware or any combination thereof and may include a general purpose digital signal processor (DSP), microcontroller, programmable logic device, programmable gate array, custom ASIC, or a general purpose microprocessor executing a computer program, the executable code for which may be stored, for example, in memory 960. Processor or controller 950 may operate in conjunction with instructions in memory 960 to cause system 900 to execute a time-of-flight measurement algorithm, for example a method 1100 shown in FIG. 11 and described in detail below.

In operation, processor or controller 950 may generate either a digital transmit signal or an analog transmit signal via an on-board digital-to-analog converter (DAC). This signal may be routed to transmit signal conditioner or processor and driver 910 which amplifies the signal or otherwise processes it for application to transmit transducer 920 to be transmitted as a burst signal. In some embodiments, transmit signal conditioner or processor and driver 910 may generate the burst signal.

Processor or controller 950 generates a transmit trigger and provides the transmit trigger to transmit signal conditioner or processor and driver 910 in response to which transmit signal conditioner or processor and driver 910 causes transmit transducer 920 to transmit the burst signal.

The burst signal is received by receive transducer 930. The received burst signal from receive transducer 930 may be processed (e.g., amplified and/or filtered) and then sampled and digitized, for example with an analog-to-digital converter, by receive signal processor and digitizer 940.

The receive trigger determines the timing of the detection window for detecting and digitizing the received burst signal. The burst signal received during the detection window is digitized and the digital samples of the received burst signal are sent to processor or controller 950 for further processing. Processor or controller 950 performs a Fourier transform on the digital samples of the received burst signal to produce frequency domain samples of the received burst signal, each of which has a corresponding amplitude value and phase value. A subset of the phase values is selected in a frequency band around the fundamental frequency of the burst signal. This selection could be based on previous knowledge of the signal fundamental frequency or from the signal region in the Fourier Transform having the greatest amplitude.

Processor or controller 950 determines the slope in of the phase values of the frequency domain samples of the received burst signal in the selected frequency band including the fundamental frequency. From this slope in, processor or controller 950 determines the relative delay of the received burst signal with respect to the center of the sampling (detection) window in the time domain, for example using Equation (4) above. Consistent relative measurements can be performed by keeping the sampling window and sampling rate constant. The center of the sampling window can be associated with an absolute time (e.g., the time when the burst signal was transmitted) through a calibration or synchronization process, allowing processor or controller 950 to estimate the time-of-flight (TOF) of the burst signal.

In some embodiments, the transmit trigger and receive trigger can be implemented as a single trigger to simplify circuitry. In this case, a delay can be added in receive signal processor and digitizer 940 to adjust the start time of the receive sample window.

Figure 10:
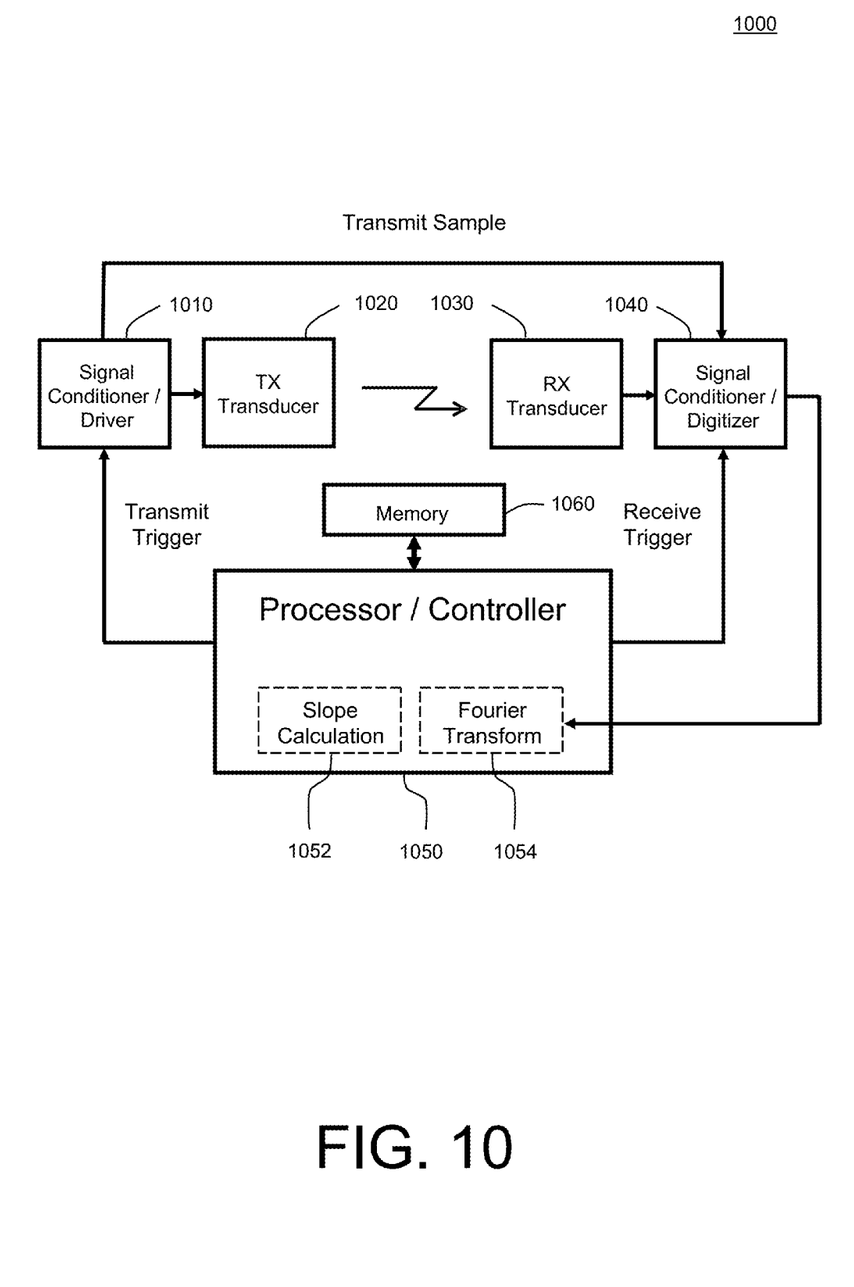

FIG. 10 illustrates another embodiment of a system 1000 for measuring the time-of-flight of a signal. System 1000 includes a transmit signal conditioner or processor and driver 1010, a transmit transducer 1020, a receive transducer 1030, a receive signal conditioner or processor and digitizer 1040, a processor or controller 1050, and memory 1060.

Details and operation of system 1000 are similar to those of system 900 discussed above, with the following significant differences.

In system 1000, transmit signal processor and driver 1010 provides a copy of the transmit burst signal to receive signal processor and digitizer 1040, which can include a separate digitizer for the producing digital samples of the transmit burst signal. Receive signal processor and digitizer 1040 digitizes both the received burst signal and a sample of the transmit burst signal at the same time, and both the transmit and received subsystems could triggered at the same time. Digital samples of both the transmit burst signal and the received burst signal within the sampling window are provided to processor 1050.

Processor 1050 performs a Fourier transform on the digital samples of the received burst signal, and also performs a Fourier transform on the digital samples of the transmit burst signal. A subset of the phase information from each Fourier output is selected in a frequency band around the fundamental frequency of the burst signal. Processor 1050 determines the slope $m_R$ of the phase values of the frequency domain samples of the received burst signal, and also determines the slope $m_T$ of the phase values of the frequency domain samples of the transmit burst signal, in the selected frequency band including the fundamental frequency. From the slopes $m_R$ and $m_T$, processor 1050 determines the relative delay of the received burst signal $to_R$, and the relative delay of the transmit burst signal $to_T$, with respect to the center of the sampling (detection) window in the time domain, for example using equation (4) above. Processor 1050 takes the difference between the two delay times to estimate the time-of-flight (TOF) of the burst signal:

$$TOF = to_R - to_T \quad (5)$$

Although the example embodiments shown and described above with respect to FIGS. 9 and 10 employ digital samples of the burst signal as a practical matter for ease of implementation with a digital processor, in theory digital samples are not required, so long as the slope of the phase response of the Fourier transform of the burst signal within a defined time window can be obtained in a frequency band around the fundamental frequency of the burst signal.

Figure 11:
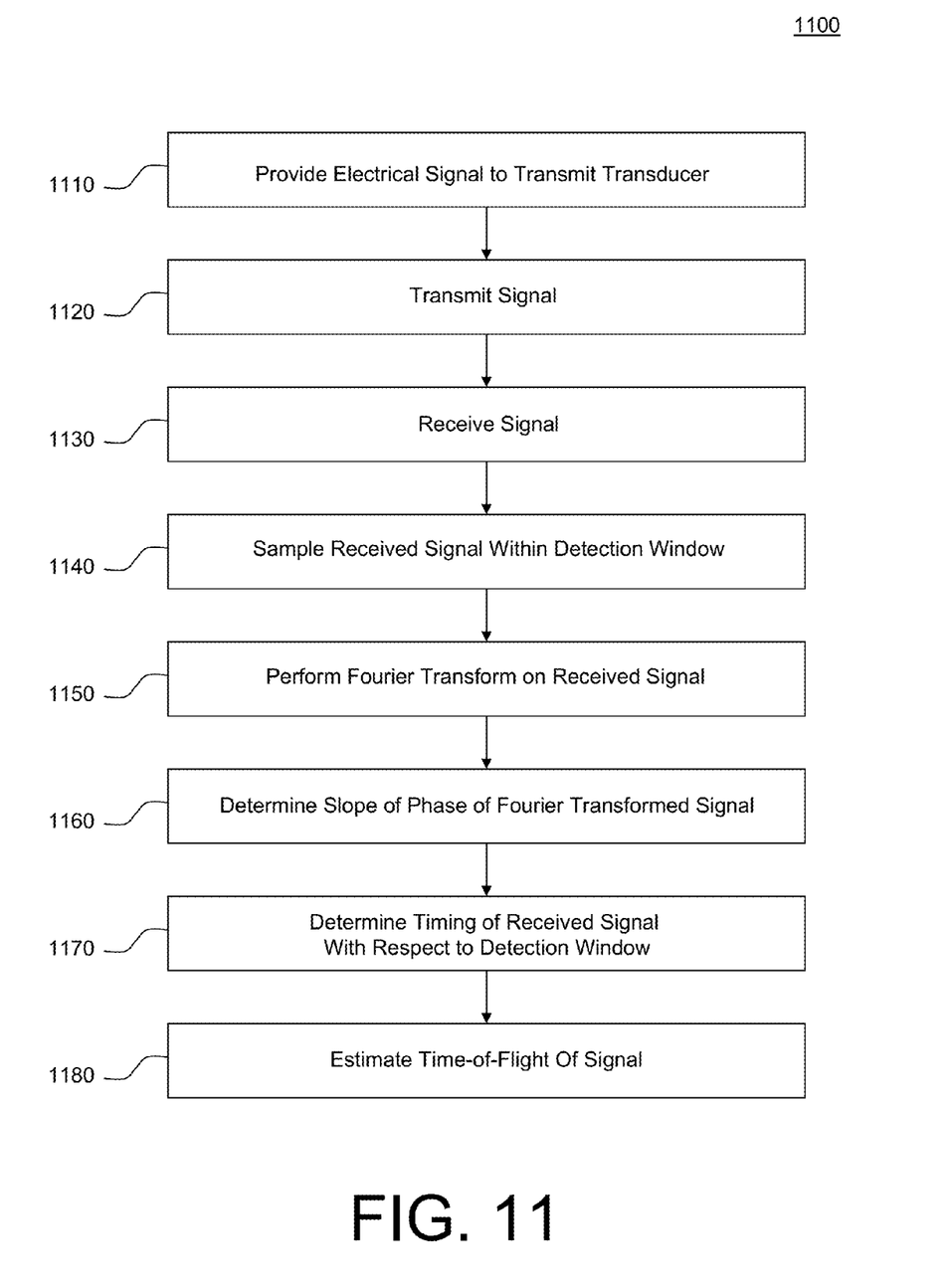
FIG. 11 illustrates one embodiment of a method of measuring the time-of-flight of a signal.

FIG. 11 illustrates one embodiment of a method 1100 of measuring the time-of-flight of a signal.

In a step 1110, an electrical signal e.g., a burst signal) is provided to a transmit transducer.

In a step 1120, the transmit transducer transmits the transmit burst signal.

In a step 1130, a receive transducer receives the burst signal.

In a step 1140, a receive signal processor defines a detection window, and samples the received signal within the detection window.

in a step 1150, a Fourier transform is performed on the received signal.

In a step 1160, the slope in of the phase characteristic of the output of the Fourier transform of the received signal is determined within a selected frequency band centered about the peak of the amplitude of the output of the Fourier transform.

in a step 1170, the timing or delay to of the received signal with respect to the detection window (e.g., the center of the detection window) is determined from the slope in found in step 1160, for example using Equation (4).

In a step 1180, the time-of-flight (TOF) of the received signal is estimated from the delay to found in step 1170.

While example embodiments are disclosed herein, one of ordinary skill in the art appreciates that many variations that are in accordance with the present teachings are possible that remain within the scope of the appended claims. The embodiments therefore are not to be restricted except within the scope of the appended claims.

The invention claimed is:

1. A method, instantiated in a non-transitory computer readable medium storing programming instructions, executable by a processor, the method comprising:

receiving a burst signal having a fundamental frequency;

producing digital samples of the received burst signal;
performing a Fourier transform on the digital samples of the received burst signal to produce frequency domain samples of the received burst signal, each frequency domain sample of the received burst signal having an associated phase value;
determining a slope of the phase values of the frequency domain samples of the received burst signal in a frequency band including the fundamental frequency; and
estimating a time-of-flight of the burst signal from the slope of the phase values of the frequency domain samples of the received burst signal in the frequency band including the fundamental frequency.

2. The method of claim 1, wherein estimating the time-of-flight of the burst signal further comprises:
defining a time window in which the received burst signal is received;
determining a delay of the received burst signal with respect to a specific point in the time window from the slope of the phase values of the frequency domain samples of the received burst signal; and
estimating the time-of-flight of the burst signal from the delay of the received burst signal with respect to the specific point in the time window.

3. The method of claim 2, wherein the specific point is the center of the time window.

4. The method of claim 2, further comprising:
generating a transmit trigger; and
transmitting the burst signal in response to the transmit trigger.

5. The method of claim 4, wherein estimating the time-of-flight of the burst signal further comprises:
generating a receive trigger at a specific time with respect to the transmit trigger; and
employing the receive trigger to define a start of the time window.

6. The method of claim 2, further comprising:
generating a trigger;
transmitting the burst signal in response to the trigger; and
wherein estimating the time-of-flight of the burst signal further comprises employing the trigger to define a start of the time window.

7. The method of claim 1, further comprising:
generating a trigger;
transmitting the burst signal in response to the trigger;
digitizing the transmit burst signal;
performing a Fourier transform on the digital samples of the transmit burst signal to produce frequency domain samples of the transmit burst signal, each frequency domain sample of the transmit burst signal having an associated phase value; and
determining a slope of the phase values of the frequency domain samples of the transmit burst signal in the frequency band including the fundamental frequency.

8. The method of claim 7, wherein estimating the time-of-flight of the burst signal further comprises determining a difference between the slope of the phase values of the frequency domain samples of the transmit burst signal and the slope of the phase values of the frequency domain samples of the received burst signal.

9. An apparatus, comprising:
a receive transducer configured to receive a burst signal having a fundamental frequency;
a first digitizer configured to produce digital samples of the received burst signal; and
a processor configured to execute an algorithm comprising:
performing a Fourier transform on the digital samples of the received burst signal to produce frequency domain samples of the received burst signal, each frequency domain sample of the received burst signal having an associated phase value;
determining a slope of the phase values of the frequency domain samples of the received burst signal in a frequency band including the fundamental frequency; and
estimating a time-of-flight of the burst signal from the slope of the phase values of the frequency domain samples of the received burst signal in the frequency band including the fundamental frequency.

10. The apparatus of claim 9, wherein the algorithm further comprises:
defining a time window in which the received burst signal is received;
determining a delay of the received burst signal with respect to a specific point in the time window from the slope of the phase values of the frequency domain samples of the received burst signal; and
estimating the time-of-flight of the burst signal from the delay of the received burst signal with respect to the specific point in the time window.

11. The apparatus of claim 10, wherein the specific point is the center of the time window.

12. The apparatus of claim 10, further comprising:
a transmit signal generator configured to generate the burst signal; and
a transmit transducer configured to transmit the burst signal in response to a transmit trigger generated by the processor.

13. The apparatus of claim 12, wherein the processor is configured to generate a receive trigger at a specific time with respect to the transmit trigger, and wherein the algorithm further comprises employing the receive trigger to define a start of the time window.

14. The apparatus of claim 9, further comprising:
a transmit signal generator configured to generate the burst signal; and
a transmit transducer configured to transmit the burst signal in response to a trigger generated by the processor,
wherein estimating the time-of-flight of the burst signal further comprises employing the trigger to define a start of the time window.

15. A method, instantiated in a non-transitory computer readable medium storing programming instructions, executable by a processor, for estimating the time of flight of a burst signal, the method comprising:
receiving the burst signal;
determining a slope of a phase characteristic of a Fourier transform of the received burst signal; and
estimating the time-of-flight of the burst signal from the slope of the phase characteristic of the Fourier transform of the received burst signal.

16. The method of claim 15, further comprising:
defining a time window in which the received burst signal is received;
determining a delay of the received burst signal with respect to a specific point in the time window from the slope of the phase characteristic of the Fourier transform of the received burst signal; and
estimating the time-of-flight of the burst signal from the delay of the received burst signal with respect to the specific point in the time window.

17. The method of claim 15, further comprising:
generating a trigger;

transmitting the burst signal in response to the trigger; and
determining a slope of the phase characteristic of the Fourier transform of the transmit burst signal.

18. The method of claim 17, further comprising determining a difference between the slope of the phase characteristic of the Fourier transform of the received burst signal and the slope of the phase characteristic of the Fourier transform of the transmit burst signal.

19. An apparatus, comprising:
a receive transducer configured to receive a burst signal having a fundamental frequency;
a first digitizer configured to produce digital samples of the received burst signal; and
a processor configured to execute an algorithm comprising:
performing a Fourier transform on the digital samples of the received burst signal to produce frequency domain samples of the received burst signal, each frequency domain sample of the received burst signal having an associated phase value;
determining a slope of the phase values of the frequency domain samples of the received burst signal in a frequency band including the fundamental frequency; and
estimating a time-of-flight of the burst signal from the slope of the phase values of the frequency domain samples of the received burst signal in the frequency band including the fundamental frequency;
a transmit transducer configured to transmit the burst signal in response to a trigger; and
a second digitizer configured to produce digital samples of the transmit burst signal in parallel with the first digitizer producing the digital samples of the received burst signal; and
the algorithm further comprising:
performing a Fourier transform on the digital samples of the transmit burst signal to produce frequency domain samples of the transmit burst signal, each frequency domain sample of the transmit burst signal having an associated phase value;
determining a slope of the phase values of the frequency domain samples of the transmit burst signal in the frequency band including the fundamental frequency, wherein the algorithm estimates the time-of-flight of the burst signal by determining a difference between the slope of the frequency domain phase samples of the transmit burst signal and the slope of the frequency domain phase samples of the received burst signal.

* * * * *